(12) United States Patent
Aseere et al.

(10) Patent No.: US 8,418,419 B1
(45) Date of Patent: Apr. 16, 2013

(54) BASE UNIT FOR MOUNTING PHOTOVOLTAIC MODULES

(75) Inventors: Lester Mickel Aseere, Parker, CO (US); Francis John Babineau, Jr., Parker, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 13/291,802

(22) Filed: Nov. 8, 2011

(51) Int. Cl.
*E04D 13/18* (2006.01)

(52) U.S. Cl.
USPC .......................... 52/173.3; 136/251; 248/237

(58) Field of Classification Search .............. 52/173.3; 136/251, 259; 248/237
See application file for complete search history.

(56) References Cited

U.S. PATENT DOCUMENTS

| | | | |
|---|---|---|---|
| 6,105,316 A * | 8/2000 | Bottger et al. ............... | 52/173.3 |
| 2006/0196128 A1* | 9/2006 | Duke ........................... | 52/173.3 |
| 2009/0266406 A1* | 10/2009 | Duke et al. ................... | 136/251 |
| 2011/0067327 A1* | 3/2011 | Eiffert et al. ................. | 52/173.3 |
| 2011/0083381 A1* | 4/2011 | David et al. .................. | 52/173.3 |
| 2011/0108083 A1* | 5/2011 | Ravestein et al. ............ | 136/244 |
| 2012/0031469 A1* | 2/2012 | Loois et al. .................. | 136/251 |
| 2012/0036799 A1* | 2/2012 | Kneip et al. ................. | 52/173.3 |
| 2012/0110931 A1 | 5/2012 | Eiffert et al. | |

* cited by examiner

*Primary Examiner* — Jeanette E Chapman
*Assistant Examiner* — James Buckle, Jr.
(74) *Attorney, Agent, or Firm* — Robert D. Touslee

(57) ABSTRACT

Embodiments of the invention provide systems and methods for mounting a solar panel to a roof of a building or structure. Structures used to mount a solar panel to a roof may include a base having a flange that extends partially or fully around a periphery of the mounting unit, a mounting surface connected with the base and configured to couple with the solar panel so that the solar panel is elevated above the roof's surface and/or oriented at an angle with respect thereto, and one or more walls or members that connect the mounting surface to the base. A flexible membrane or skirt may be coupled with the flange and may extend laterally therefrom. The flexible membrane or skirt may be coupled with the roof to secure the mounting unit and solar panel to the roof.

26 Claims, 14 Drawing Sheets

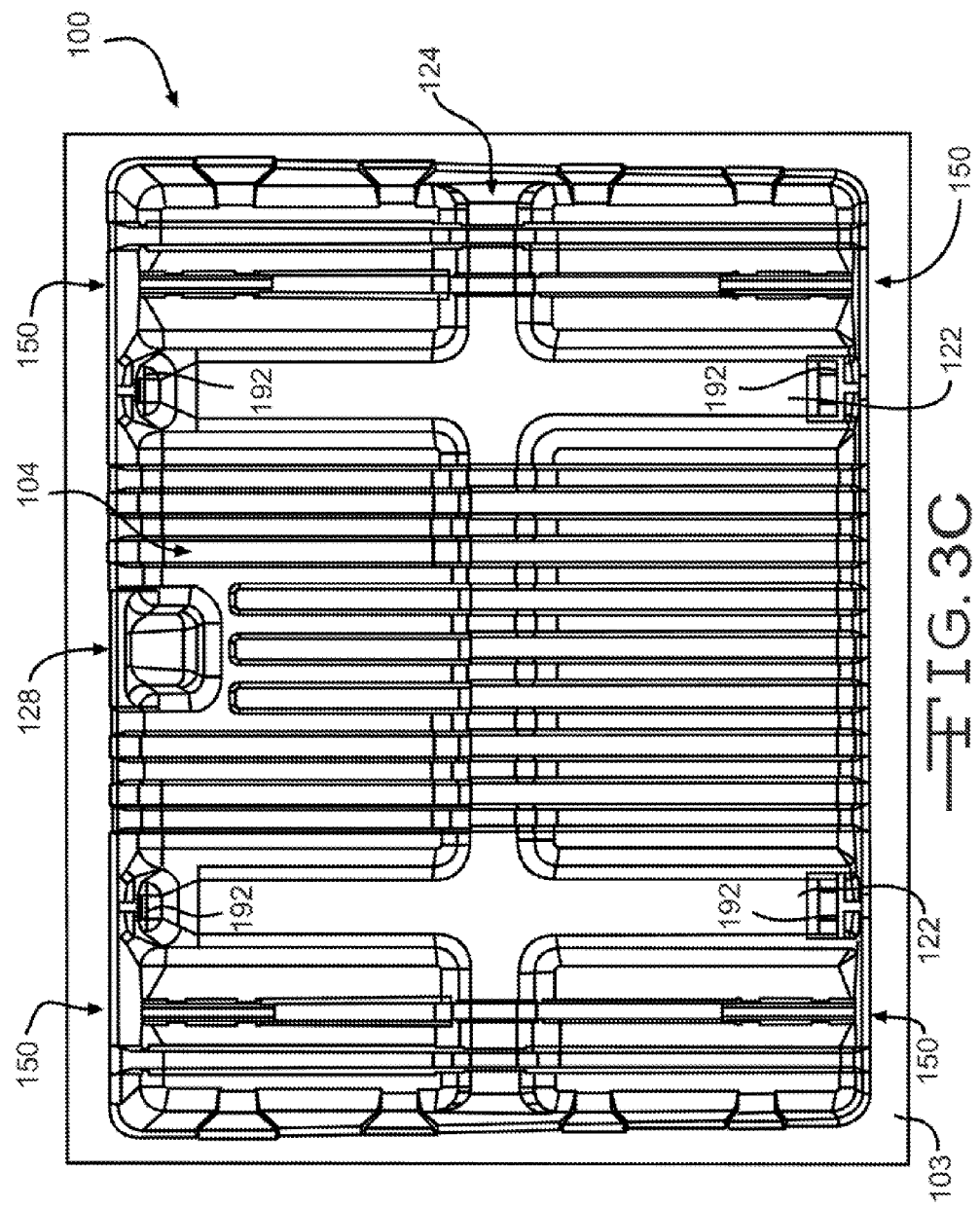

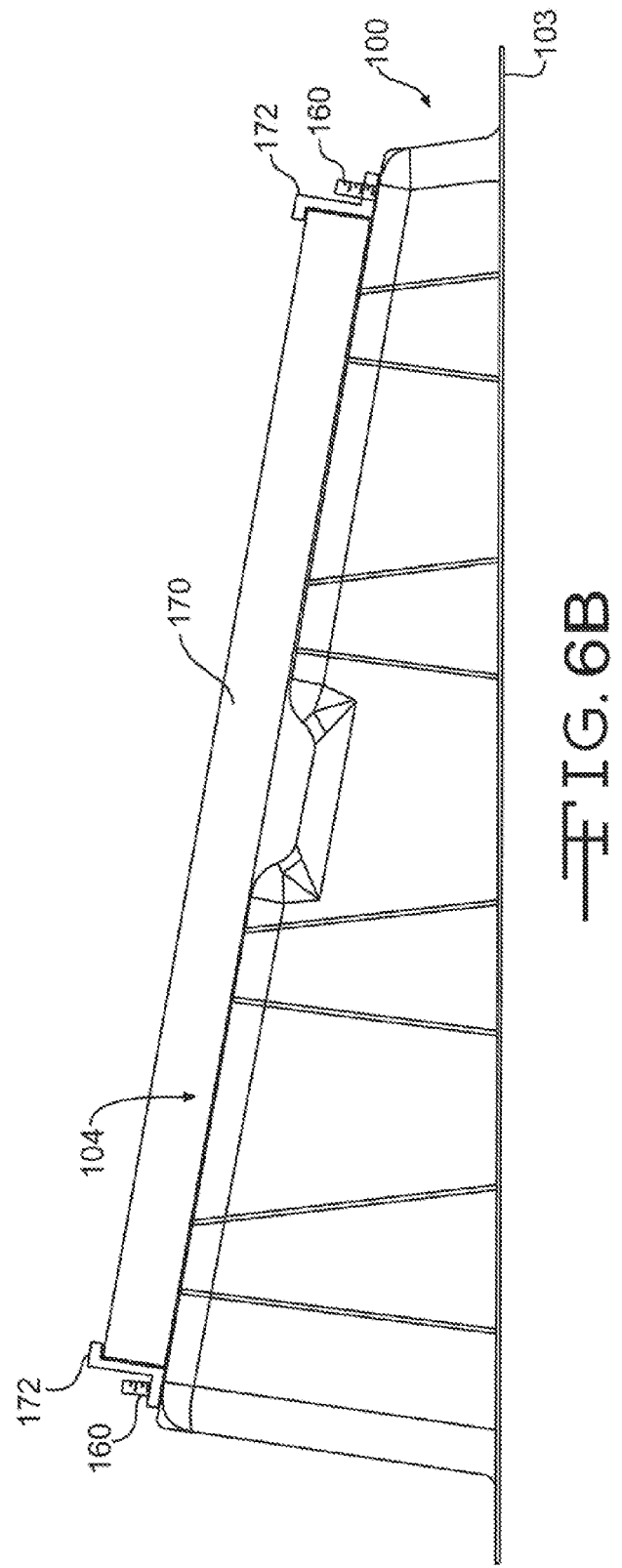

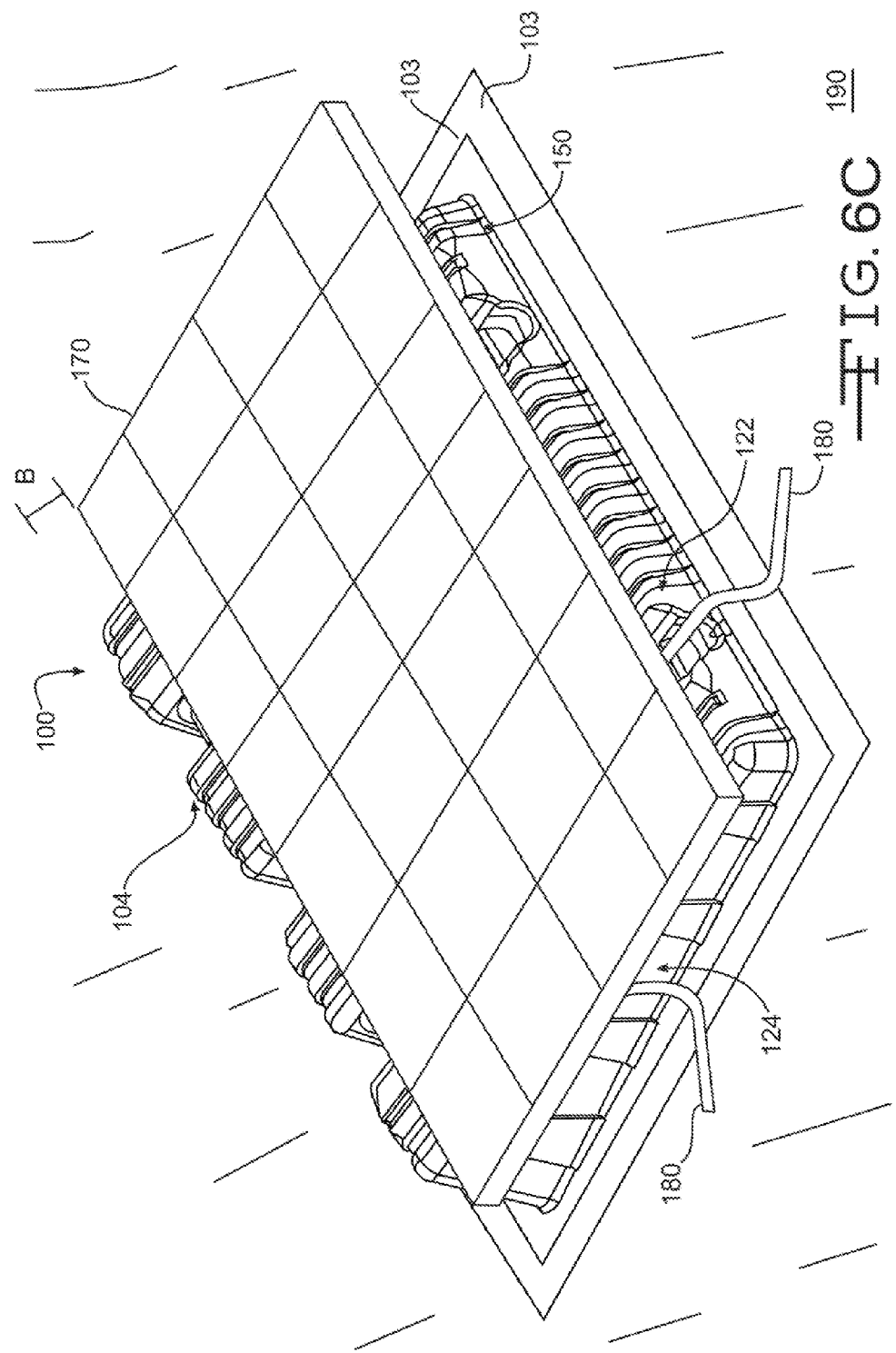

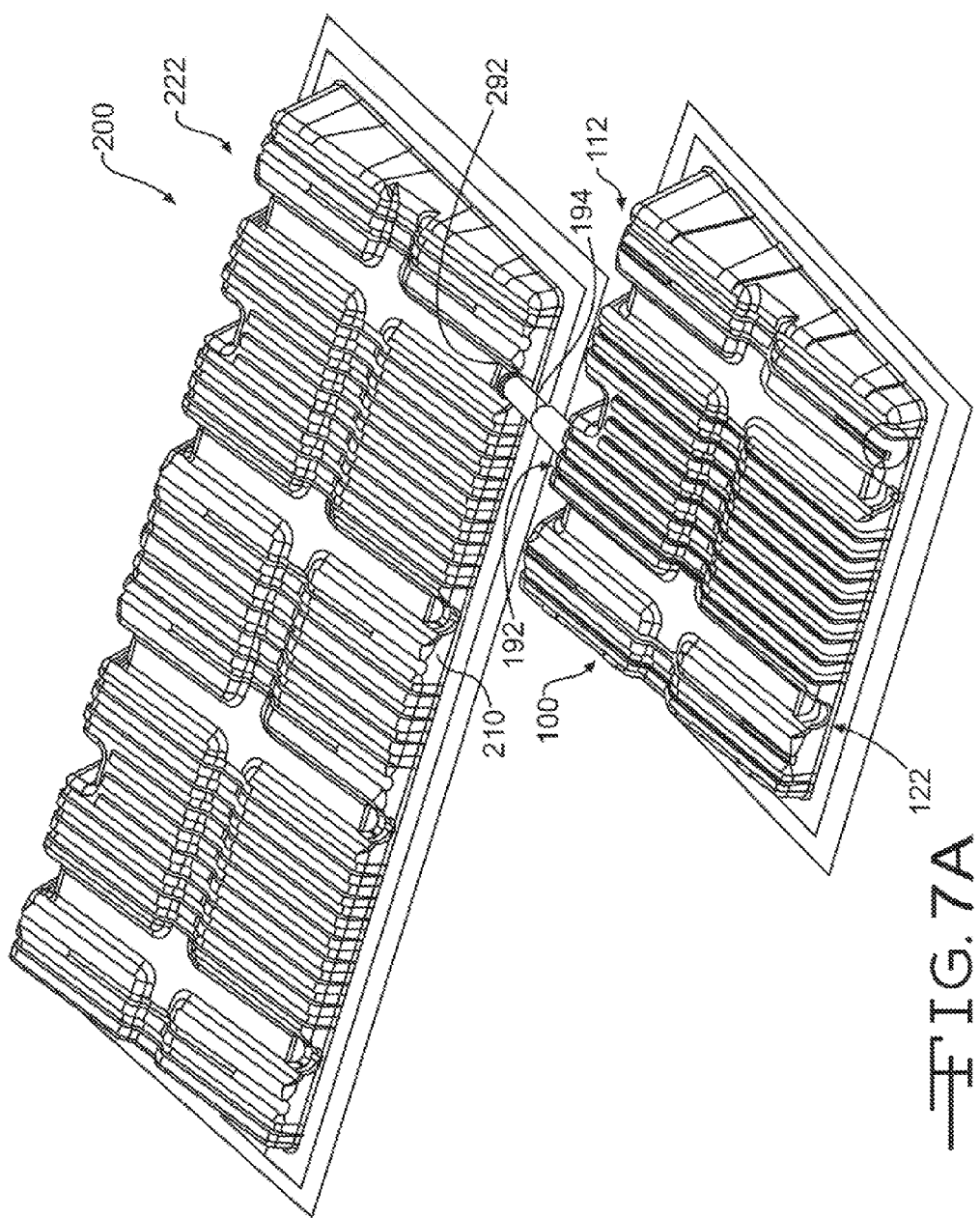

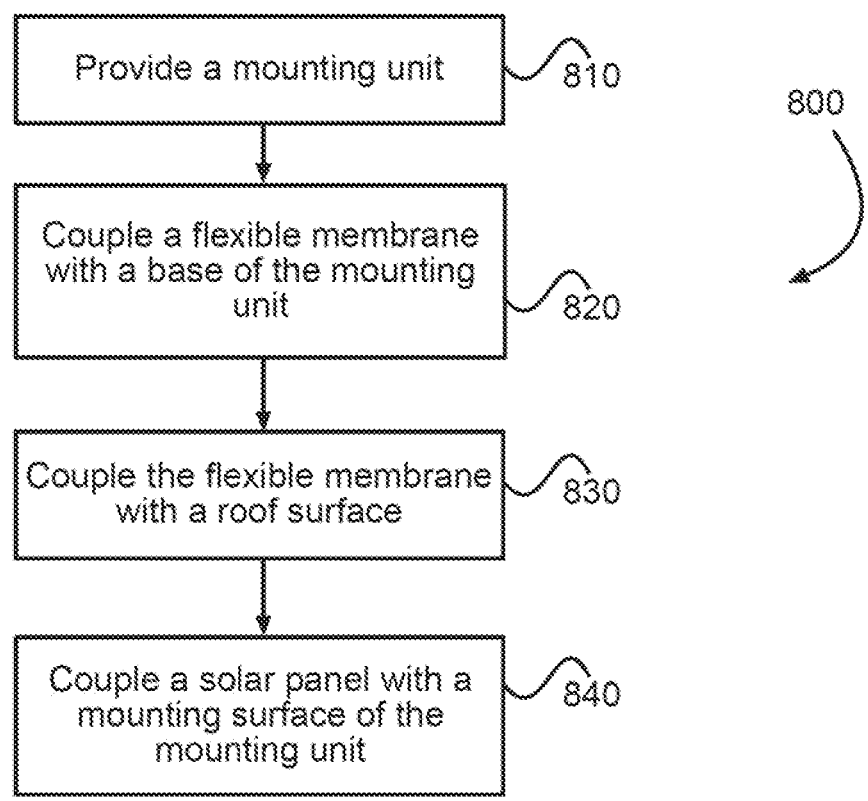

BASE UNIT FOR MOUNTING PHOTOVOLTAIC MODULES

BACKGROUND OF THE INVENTION

Solar or photovoltaic panels or modules are often positioned on the roof of a structure or building to generate electricity in order to operate various equipment, machinery, lighting or other fixtures, and the like. The solar panels are often held in place atop the roof by mounting the solar panel to a frame and attaching the frame to the roof. Common methods of attaching the frame to the roof include using pole mounts that are directly attached to the roof deck via one or more mechanical fasteners (e.g., bolts, screws, and the like) that penetrate through a portion or the entirety of the roof's structure. The penetrations through the roof present a potential failure point where future water leakage or other problems may occur. Additional time and cost is also required to seal such penetrations to minimize or eliminate such leakage or other problems. Pole mounts also limit the ability of the solar panel to be easily moved or removed from a roof.

Alternatively, another common method that may not require roof penetrations includes using ballasted footing mounts, such as concrete blocks, steel bases, paver stones, rocks, and the like. Such ballasted footing mounts use heavy weight to secure the solar panel and frame to the roof. The heavy ballasted footing mounts produce concentrated or point loads on the roof structure at the point where the ballasted footing mounts contact the roof's surface. Because roofs are often designed to only support a specified load, which normally includes snow and/or other load types, it is critical not to exceed the structural limitations of the roof. Heavy concentrated or point loads may place undue and/or unsafe stress on the roof at the point of contact and/or may damage components of the roof system even when the heavy point loads do not otherwise present a structural risk. Further, the concentrated or point load may also crush or compress insulation thereby reducing R value and/or stressing the roof membrane.

The use and/or desire for solar panels on roofs appear to be increasing as individuals and companies find ways to be more environmentally conscious. As such, there is a constant need for improved methods and systems for securing solar panels to roofs in such a manner as to not degrade the performance or useful service life of the roof.

BRIEF SUMMARY OF THE INVENTION

Embodiments of the invention provide methods, devices, and systems for mounting solar panels to a roof of a building or structure. In one aspect, embodiments of the invention provide a mounting unit couplable with a solar panel and a roof of a structure so as to mount the solar panel on the roof. The mounting unit may include a base, a mounting surface connected with the base and configured to couple with the solar panel so that the solar panel is elevated above a surface of the roof, a plurality of walls that connect the mounting surface to the base, and a flexible membrane coupled with the base and configured to couple with the roof to secure the mounting unit and solar panel to the roof.

The mounting surface may be angled with respect to the base between about 0 degrees and about 30 degrees. The plurality of walls may include a rear wall that connects a rear side of the mounting surface to a rear side of the base so that the rear wall is oriented at an angle with respect to the base. The angle of the rear wall with respect to the base may be between about 95 degrees and about 135 degrees. The plurality of walls may also include two sides walls that connect opposite sides of the mounting surface with the base. Each side wall may be oriented at an angle with respect to the base between about 90 degree and about 135 degrees.

The base may include a flange that extends around a periphery of the mounting unit and the flexible membrane may couple with the flange. The mounting unit may also include an adhesive tape coupled with a portion of the flexible membrane that extends laterally from the flange and further coupled with the roof. The adhesive tape may weatherproof the mounting unit (e.g., may keep water and/or other elements from penetrating under the flexible membrane and/or flange). The mounting surface may further include a plurality of ribs that define channels that provide air access to a bottom surface of the solar panel. The mounting surface may additionally include a plurality of channels that each receive a fastener to couple the solar panel with the mounting surface. The plurality of channels may be or include inverted T-shaped channels that slidingly receive the fastener. The mounting surface may include one or more main channels configured to route one or more electrical wires electrically coupled with the solar panel.

In one embodiment, the flexible membrane is adhesively bonded with a membrane of the roof. In another embodiment, the flexible membrane is heat welded to a membrane of the roof. In yet another embodiment, the flexible membrane is coupled to the roof via one or more mechanical fasteners.

The roof may include a membrane material made of: Thermo Plastic Olefin, Ethylene Propylene Diene Monomer, Polyvinyl Chloride, thermoplastic vulcanizates, bitumen or modified bitumen, and the like. The flexible membrane material may include: Thermo Plastic Olefin, Ethylene Propylene Diene Monomer, Polyvinyl Chloride, thermoplastic vulcanizates, Thermo Plastic Olefin backed with a polyester fleece, and the like. The material of the mounting unit may include: polyethylene, polyproplylene, styrene, polyvinyl chloride, and the like.

In another aspect, embodiments of the invention include a mounting unit couplable with a solar panel and a roof of a structure so as to mount the solar panel on the roof. The mounting unit may include a base having a flange that extends around a periphery of the mounting unit. The base may be configured to be positioned adjacent or atop the roof of the structure. The mounting unit may also include a mounting surface connected with the base and configured to couple with the solar panel so that the solar panel is elevated above the roof's surface and oriented at an angle with respect thereto. The mounting unit may further include a plurality of walls that connect the mounting surface to the base and a flexible membrane skirt coupled with the flange and extending laterally therefrom. The flexible membrane skirt may be couplable with the roof to secure the mounting unit and solar panel to the roof.

In another aspect, embodiments of the invention provide a method of mounting a solar panel to a roof of a structure. The method may include providing a mounting unit comprising: a base, a mounting surface, and a plurality of walls that connect the mounting surface to the base so that the mounting surface is elevated with respect to the base. The method may also include coupling a flexible membrane with the base and coupling the flexible membrane with the roof so as to secure the mounting unit to the roof. The method may further include coupling a solar panel with the mounting surface.

In one embodiment, coupling (and/or weatherproofing) the flexible membrane with the roof may include applying an adhesive tape over at least a portion of the flexible membrane and the roof. In another embodiment, coupling the flexible membrane with the roof may include adhesively bonding the flexible membrane with a membrane of the roof. In yet another embodiment, coupling the flexible membrane with the roof may include heat welding the flexible membrane to a membrane of the roof. In still another embodiment, coupling the flexible membrane with the roof may include mechanically fastening the flexible membrane to a membrane of the roof.

In one embodiment, coupling the solar panel with the mounting surface may include: inserting a bolt within a mounting channel of the mounting surface where the mounting channel is configured to prevent removal of the bolt in a direction substantially normal to the mounting surface; positioning the bolt through an aperture of a mounting feature of the solar panel; and securing the bolt with respect to the solar panel.

The method may additionally include positioning one or more electrical wires of the solar panel within a main channel of the mounting surface so as to electrically couple the solar panel with one or more other devices. The one or more other devices may include: an additional solar panel, a power device, DC/DC optimization device, a combiner box, a breaker, a fuse, a disconnect switch, a power inverter, a control device, and the like.

BRIEF DESCRIPTION OF THE DRAWINGS

Embodiments of the present invention are described in conjunction with the appended figures:

FIGS. 3A-3C illustrate a side view, front view, and top view of the mounting unit of FIG. 1 according to an embodiment of the invention.

FIGS. 6A and 6B illustrate side views of a solar panel being mounted atop a mounting unit according to an embodiment of the invention.

FIG. 6C illustrates a perspective view of the mounting unit of FIGS. 6A and 6B having the solar panel mounted atop a mounting surface of the mounting unit and the mounting unit attached to a roof's surface according to an embodiment of the invention.

FIG. 7A-7C illustrate various views of a conduit that may be used to connect channels of adjacent mounting units according to an embodiment of the invention.

FIG. 8 illustrates a method of mounting a solar panel to a roof's surface according to an embodiment of the invention.

Figure 1:
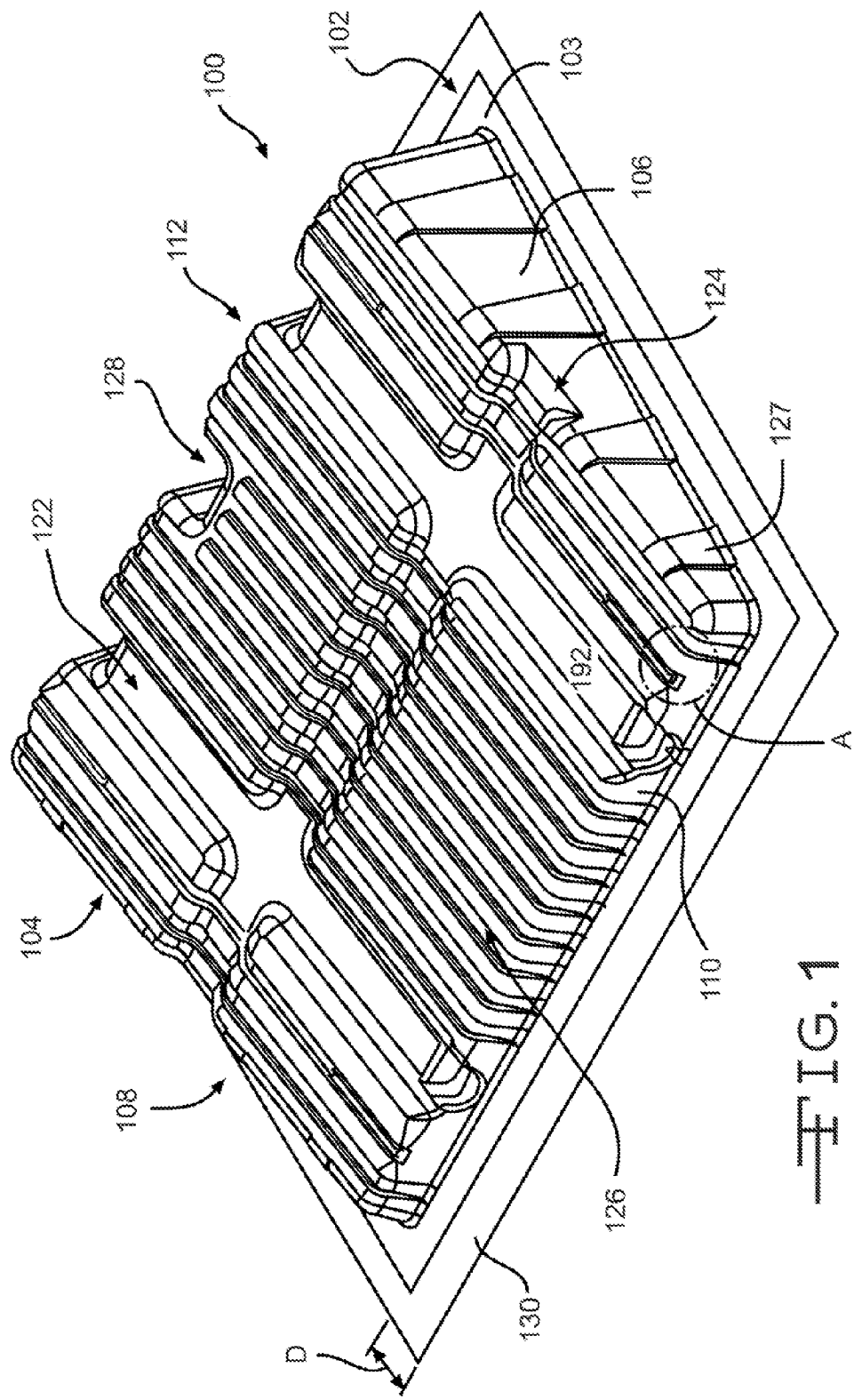
FIG. 1 illustrates a perspective view of a mounting unit according to an embodiment of the invention.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the embodiments will provide those skilled in the art with an enabling description for implementing one or more embodiments. It being understood that various changes may be made in the function and arrangement of elements without departing from the spirit and scope of the invention as set forth in the appended claims. Specific details are given in the following description to provide a thorough understanding of the embodiments. However, it will be understood by one of ordinary skill in the art that the embodiments may be practiced without these specific details. Also, it is noted that methods or processes may be depicted as a flowchart or a block diagram. Although a flowchart may describe the operations as a sequential process, many of the operations can be performed in parallel or concurrently. In addition, the order of the operations may be re-arranged. Further a process could have additional steps not discussed or included in a figure. Furthermore, not all operations in any particularly described process may occur in all embodiments.

As used herein, the term solar panel (also referred to herein as photovoltaic panels or modules) includes any panel or array of solar or photovoltaic cells. Such panels are used to generate and supply electricity, typically in residential and commercial applications. For example, solar panels are often installed on the roofs of homes and buildings to generate and supply electricity to the home or building to operate various machinery, equipment, components, lighting and/or other fixtures, and the like. Many buildings and/or homes often include several solar panels arranged in a grid or array that form a photovoltaic system. The solar panels may be electrically coupled to increase the power generated and provided to the home or building.

The application references several angles measured relative or with respect to the base. It should be understood that "relative or with respect to" the base refers to a surface upon which the base rests, which may be the surface of a roof or other structure. In many embodiments this surface is substantially equivalent to or roughly parallel with the surface of the mounting unit's flange. Thus, it should be realized that any specified angle may also, or may alternatively, be measured relative or with respect to a surface of the mounting unit's flange.

Embodiments of the invention provide methods and systems for mounting a solar panel or photovoltaic module to a roof a structure, such as a home or building. A mounting unit or device may be used to mount the solar panel to the roof. The mounting unit may be a single hollow component comprising various ribs, radiuses, draft angles, thin walls, and/or integrated mounting hardware to provide a rigid yet lightweight structure. In other embodiments, the mounting unit may include multiple components or pieces that couple or butt together. The mounting unit may include a base that may define a lower periphery of the mounting unit. The base may include a flange that extends laterally from the mounting unit and extends partially or fully around the lower periphery of the mounting unit. The flange may extend out from the mounting unit to between about 0.5 inches and about 6 inches, and more commonly between about 2 and about 4 inches. The base's flange may facilitate in distributing the weight of the mounting unit and solar panel, preferably evenly or uniformly, across a relatively large surface area of the roof, thereby minimizing or eliminating concentrated or point loads. The base and flange may be positioned adjacent the roof's surface. The mounting unit may be made from a reinforced or un-reinforced plastic, such as polyethylene, polypropylene, styrene, polyvinyl chloride, and the like and may be made in one or more pieces or components via vacuum forming, injection molding, and the like. The total weight of the mounting unit may be between about 10 and about 17 pounds, and more commonly about 12 pounds. In some embodiments, the mounting unit distributes a load (e.g., the weight of the mounting unit, attached solar panel, and any other components) on the roof of less than about 1.0 lb/in$^2$ and more commonly less than about 0.5 lb/in$^2$. In a specific embodiment, the applied load of the mounting unit and solar panel directly on the roof below the mounting unit's flange is about 0.3 lb/in$^2$ or less.

The mounting unit may also include a mounting surface that is connected with the base via a plurality of walls. The mounting surface may be elevated above the base and oriented at an angle relative to the base so as to elevate an attached solar panel above the roof's surface and direct the solar panel toward sunlight incident on the roof's surface. The mounting surface and/or walls may include ribs that provide rigidity to the mounting unit structure. The ribs may define channels that allow air to access the underside of the solar panel to cool the solar panel and enhance electricity generation or production. The air flowing through the channels underneath the solar panel may also equalize wind pressure and thereby minimize wind loads placed on the solar panel and/or mounting unit. The walls of the mounting unit may be angled with respect to the base unit to minimize uplift and/or lateral wind loads and/or allow individual mounting units to be stacked atop one another to optimize storage and/or transport.

The mounting surface may also include one or more main channels that are sized larger than the channels defined by the ribs and that are configured to receive and/or route one or more electrical wires and/or power cables that couple with the solar panel. The mounting unit may include one or more longitudinally extending main channels and one or more transversely extending main channels. The main channels may also allow wind pressure equalization and natural convection cooling to occur as described herein. A structure's roof may include additional mounting units and solar panels arranged in a grid or array and the main channels may allow adjacent solar panels to be electrically coupled. Electrically coupling adjacent solar panels may include routing electrical wires or cables through a telescoping conduit that releasably couples with adjacent mounting units. The mounting surface may also include a ground channel that allows an electrical ground to be connected with the solar panel.

The mounting surface may also include one or more mounting features that allow the mounting unit to releasably couple with the solar panel. The mounting features may include mounting channels that are shaped to receive an insert that couples with a fastener or fasteners to secure the solar panel to the mounting surface of the mounting unit. The insert and/or mounting channels can comprise an inverted T shape, or other shape, that allows the insert and/or channel to slidingly receive the fasteners, such as a bolt and the like, and that prevents or restricts removal of the fasteners in a direction roughly normal or orthogonal to the mounting surface. The fasteners (e.g., bolt and the like) may extend roughly normal or orthogonal from the mounting surface and may be inserted through an aperture of a mounting component (e.g., a mounting plate having a Z profile) of the solar panel and secured with respect thereto. In some embodiments, the insert may be integrated into the mounting surface, such as by molding the insert into the mounting surface. The integrated insert may provide a more secure attachment between the solar panel and the mounting unit.

The mounting unit may further include a flexible membrane that couples with the base, such as the flange. The flexible membrane (also referred to herein as a skirt or flexible skirt) may be made of common roofing membrane materials such as: Thermo Plastic Olefin (TPO), Ethylene Propylene Diene Monomer (EPDM), Polyvinyl Chloride (PVC), thermoplastic vulcanizates (TPV), and/or the other roofing membrane materials described herein. In one embodiment, the flexible membrane includes a TPO material with a polyester fleece attached to the bottom surface. The polyester fleece may enable the mounting unit to be adhesively bonded to an asphaltic or bituminous roof membrane by absorbing liquid adhesives that bond the skirt to the textured roof surface. The fleece may be thermally embedded in the bottom of the TPO membrane and provide a good bonding surface for adhesives to adhere the mounting unit to a bituminous, asphaltic, or other roof surface. The flexible membrane may be bonded to an underside of the flange and may extend laterally beyond the flange. In some embodiments, the flexible membrane extends beyond the flange by between about 1 inch and about 5 inches, and more commonly by about 2 inches. The flexible membrane may be coupled with a membrane material of the roof, which may include: Thermo Plastic Olefin (TPO), Ethylene Propylene Diene Monomer (EPDM), Polyvinyl Chloride (PVC), thermoplastic vulcanizates (TPV), and the like. The flexible membrane may be coupled with the flange and/or roof membrane via an adhesive, tape, heat welding, mechanical fasteners, and the like. The flexible membrane may be a large single piece or strip of material or several individual strips or segments of material. If a large single membrane is used for the membrane, an inner portion of the membrane may be removed to allow individual mounting units to be stacked atop one another for transport and/or storage.

The flexible membrane may allow the mounting unit to easily couple with various types of roof surfaces. The membrane material used may be selected based on the roofing material the membrane will couple with. The membrane may also function as a protective layer between the flange or base and the roof surface, such as by preventing or limiting relative motion between the flange and the roof surface that otherwise could result in roof penetrations and possible leakage. The membrane or skirt may be made of a flexible or compliant material to compensate for small variations in the roof's surface, thereby functioning to ensure a firm and continuous bond between the mounting unit and the roof's surface. For example, the flexible membrane may conform to and bond with uneven and/or rough surfaces of the roof and thereby form a continuous bond with roof's surface. The membrane may further function to allow the mounting unit and solar panel to be easily removed from the roof's surface. For example, the membrane may be removed (e.g., cut) from the roof or mounting unit so that the mounting unit and attached solar panel may be uncoupled from the roof. The mounting unit may then be fitted with another membrane and the mounting unit and/or solar panel reattached to the roof or attached to a different roof.

Wind uplift and/or loads may be further minimized by sealing the mounting unit to the roof and angling the rear wall with respect to the base. This may facilitate in directing winds, such as northerly winds, up and over the mounting unit and/or solar panel. When coupled with a solar panel, the mounting surface may extend beyond the solar panel by between about 1 and 10 inches and more commonly about 2 inches. This may limit the amount of wind that can get under the solar panel and generate additional wind loads. While embodiments of the invention have been generally described, additional features will be evident with reference to the figures.

Referring now to FIGS. 1 and 3A-6C, shown are various views of a mounting unit 100 configured to couple with a solar panel 170 in order to mount the solar panel to a roof (e.g., 190 of FIGS. 5 and 6B) of a structure, such as a home or building. Mounting unit 100 includes a base 102 that defines a lower periphery of mounting unit 100. Base 102 includes a flange 103 that laterally extends from mounting unit 100. Flange 103 may be a single structure that extends around the entire lower periphery of mounting unit 100, or, in some embodiments, flange 103 may only extend partially around mounting unit 100 and may include several flanges members or components. As shown in FIG. 1, flange 103 extends laterally about 2 to 4 inches from the mounting unit 100 around the entire lower periphery. In other embodiments, flange 103 may laterally extend more or less than this amount from mounting unit 100 (e.g., between about 0.5 and about 6 inches). Flange 103 may distribute, preferably evenly or uniformly, a load (e.g., the weight) of the mounting unit 100 and attached solar panel 170 across an area of roof 190. Flange 103 may also provide a relatively flat surface to which a flexible membrane 130 or other material may attach. One advantage of using flange 103 is that the mounting unit 100 and solar panel 170 load is distributed across an area the roof's surface, thereby minimizing concentrated or point loads. In some embodiments, however, base 102 may not include a flange and may instead include an edge, one or more contact points or components (e.g., feet), a plurality of elongate support members, and the like.

Figure 3A:
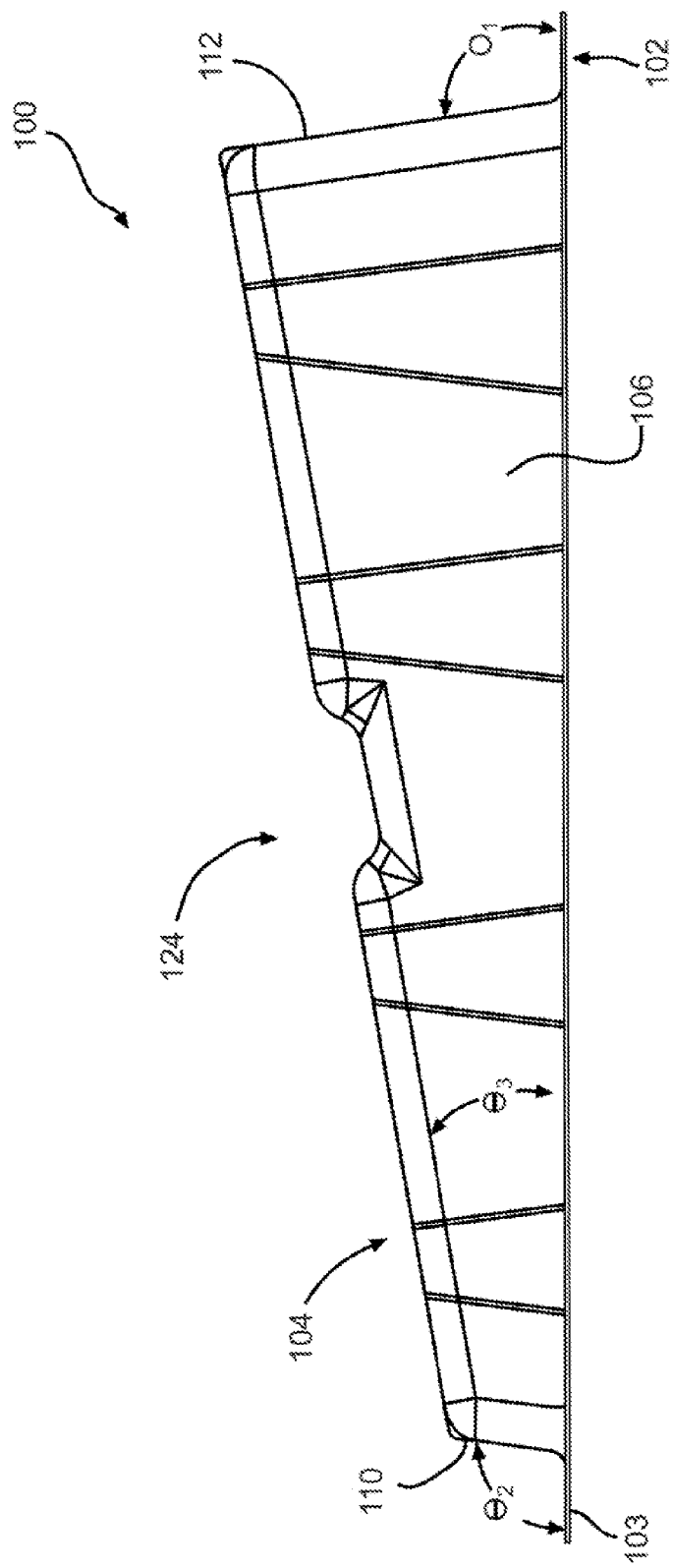
Figure 3B:
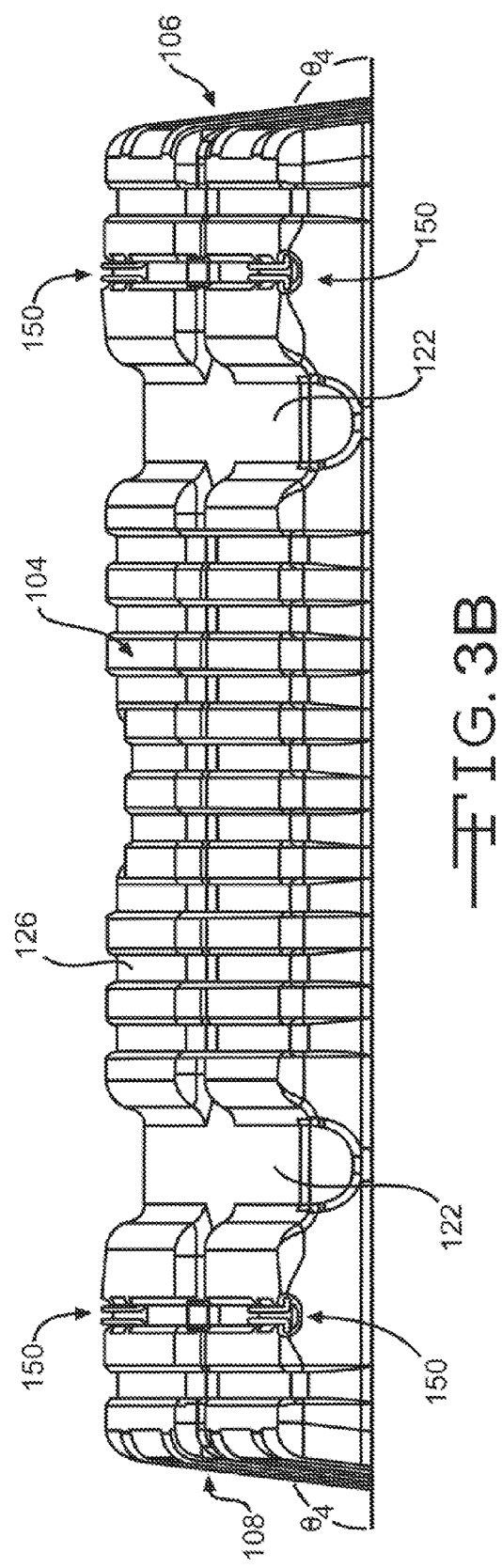

Flange 103 is connected to a plurality of walls around the periphery of mounting unit 100. Specifically, flange 103 connects with a front wall 110, a rear wall 112, and left and right walls, 108 and 106, respectively. As shown in FIG. 3A, rear wall 112 may be oriented at an angle, $\theta_1$, with respect to base 102 or flange 103 so as to minimize uplift and/or wind loads exerted on mounting unit 100 and the attached solar panel 170 by directing air up and over mounting unit 100 and/or attached solar panel 170. In some embodiments, $\theta_1$ may be angled between about 95 degrees and about 135 degrees, and more commonly about 100 degrees, with respect to base 102 or flange 103. Front surface 110 may similarly be oriented at an angle, $\theta_2$, with respect to base 102 or flange 103 to minimize uplift and/or wind loads. $\theta_2$ may be between about 90 degrees and about 135 degrees, and more commonly about 95 degrees, with respect to base 102 or flange 103. As shown in FIG. 3B, right wall 106 and left wall 108 may similarly be oriented at an angle, $\theta_4$, with respect to base 102 or flange 103 to likewise minimize uplift and/or wind loads. $\theta_4$ may be between about 90 degrees and about 135 degrees, and more commonly about 94 degrees, with respect to base 102 or flange 103.

Mounting unit 100 also includes a top structure or mounting surface 104 connected with walls, 106, 108, 110, and 112. Mounting surface 104 is elevated above base 102 so that the attached solar panel 170 is elevated above the roof's surface 190. As shown in FIG. 3A, mounting surface 104 may be oriented at an angle $\theta_3$ with respect to base 102 or flange 103. In some embodiments, $\theta_3$ may be between about 0 degrees and about 30 degrees, and more commonly about 10 to 15 degrees, with respect to base 102 or flange 103. $\theta_3$ may be angled such that the attached solar panel 170 is directed or angled toward sunlight incident on the roof's surface 190, thereby increasing energy production or generation. $\theta_3$ may also be useful for promoting drainage and/or self-cleaning via rain runoff of mounting unit 100 and solar panel 170. This design (i.e., $\theta_3$ angled to some degree) may be especially useful in application involving substantially flat or low slope roofs (e.g., 3-in-12 pitch or less), such as those commonly used in many commercial buildings. In other embodiments, $\theta_3$ may be minimal so that mounting surface 104 is substantially parallel with base 102 or flange 103. This design may be useful in high slope roofs, such as those commonly used for homes or other buildings.

Mounting unit 100 illustrated in FIGS. 1 and 3A-6C comprises a single hollow device. The use of a single hollow component for mounting unit 100 may provide rigidity and added structure to the mounting unit 100. Further, the hollow interior of mounting unit 100 may allow individual units to be stacked for compact storage and/or transport. In other embodiments mounting unit 100 may include multiple pieces or components that couple together and/or may include various openings or open regions. For example, walls 106, 108, 110, and 112, and/or mounting surface 104 may be a frame having various longitudinally and transversely extending elements or members that define the walls and mounting surface. Mounting unit 100 may be made from a reinforced or un-reinforced plastic, such as polyethylene, polypropylene, styrene, polyvinyl chloride, and the like and may be formed via a vacuum forming process, injection molding process, and the like. In one embodiment, the weight of the mounting unit may be between about 10 and about 17 pounds, and more commonly about 12 pounds. Mounting unit 100 includes various ribs 126, radiuses, draft angles, thin walls, and/or mounting hardware (e.g., mounting channel 150) that provide a rigid yet lightweight structure. In some embodiments, mounting unit 100 may have a longitudinal length of between about 55 inches and about 70 inches, and more commonly between about 60 and 65 inches, to accommodate a single solar panel in a variety of sizes. Likewise, mounting unit 100 (or mounting unit 200) may have a transverse length of between about 45 inches and about 65 inches, and more commonly between about 50 and 60 inches.

As described previously, mounting surface 104 and one or more of the walls 106, 108, 110, and 112 may include one or more ribs, 126 and 127, respectively. The ribs, 126 and 127, may provide structural rigidity for mounting unit 100 and may also define channels that allow air to flow underneath and access a bottom surface of the attached solar panel 170 so as to provide passive ventilation and/or convection cooling of the solar panel and enhance electricity production. Put another way, ribs 126 and/or 127 may enable air convection from the lower front wall 110 to the higher rear wall 112 to remove heat from the under surface of solar panel 170 (i.e., the surface facing mounting surface 104). The channels defined by the ribs, 126 and 127, may also allow wind pressure to be equalized under the solar panel 170 by allowing air to flow around and over solar panel 170 and between solar panel 170 and mounting surface 104.

In some embodiment, the channels defined by ribs, 126 and/or 127, may be narrow and may extend fully or partially from front surface or wall 110 to rear surface or wall 112. In other embodiments, a combination of transversely extending and longitudinally extending channels may be used. The channels may be between about 0.25 inches and 3 inches wide, and more commonly about 1 inch wide, and may be between about 0.25 inches and about 3 inches deep, and more commonly about 1 inch deep. Additionally, in some embodiments, mounting unit 100 may include one or more apertures or holes through one or more of walls 106, 108, 110, and 112 for wind pressure equalization and/or water drainage.

Mounting surface 104 also include one or more main channels that are sized wider and/or deeper than the channels defined by ribs 126 and/or 127. For example, mounting surface 104 is shown having one longitudinally extending main channel 124 that extends from left surface or wall 108 to right surface or wall 106, and shown having two transversely extending main channels 122 that each extend from front wall 110 to rear wall 112. In other embodiments, mounting surface 104 may include more or less main channels than those shown, which may each extend partially or fully between the various walls. Main channels, 122 and 124, may be used to route electrical cables and wires 180 that couple with solar panel 170 as shown in FIG. 6C. For example, electrical wires 180 may be routed from solar panel 170 through longitudinally extending main channel 124 and coupled with another solar panel (and mounting unit) positioned adjacent solar panel 170 and/or with another device, component, unit, and the like. Electrical wires and cables 180 may likewise be routed or run along transversely extending main channels 122 and coupled with adjacent solar panels, components, devices, units, and the like. In this manner, a grid or array of solar panels and mounting units may be coupled together atop a structure of building's roof to form a photovoltaic power generation system.

In some embodiments, main channels, 122 and/or 124, may be between about 2 inches and 6 inches wide, and more commonly about 4 inches wide, and may be between about 0.5 inches and about 3 inches deep, and more commonly about 1.25 inches deep. Main channels, 122 and/or 124, may likewise allow air to flow underneath and access the underside of solar panel 170 and thereby provide the benefits described above (e.g., wind pressure equalization, convection cooling, and the like). The deeper and wider main channels, 122 and 124, may allow air to easily pass underneath solar panel 170 and/or between solar panel 170 and mounting surface 104. In some embodiments, wind or air may flow underneath solar panel 170 through main channels, 122 and 124, and exit from underneath solar panel 170 through the narrow channels defined by ribs 126 to equalize wind pressure and/or cool solar panel 170.

Mounting unit 100 may also include a ground channel 128 within which a grounding lug or component (not shown) of solar panel 170 (or coupled therewith) may be positioned. The grounding lug or component (not shown) may be electrically coupled with an electric ground within ground channel 128. In some embodiments, ground channel 128 is positioned substantially centrally along rear wall 112 of mounting unit 100, although any other position may be possible.

Mounting unit 100 further includes one or more mounting feature or components 150 that allow mounting unit 100 to releasably couple with solar panel 170. In one embodiment, mounting unit 100 includes a mounting feature or component 150 positioned in each of four corners, as shown in FIGS. 1 and 3A-6C. As shown in the enlarged section A of FIG. 1, mounting feature 150 includes an insert 152 positioned and held within mounting surface 104. Mounting feature 150 may be configured (e.g., via edges or flanges 156) to prevent insert 152 from being withdrawn from mounting surface 104 in a direction normal to mounting surface 104. The insert 152 may be inserted into the mounting surface 104 after the mounting unit 100 is formed (e.g., via vacuum forming, injection molding, and the like), or may be integrated into the mounting surface 104 during the forming process, such as by positioning the insert or multiple inserts 152 in a mold and forming the mounting unit 100 onto or over insert(s) 152. Integrating the insert(s) 152 with mounting unit 100 in this manner may provide a more secure attachment with the mounting surface 104 and mounting unit 100. In some embodiments an insert 152 is not included and a pair of edges or flanges 156 of mounting feature 150 form an inverted T slot that provides the solar panel 170 mounting functions described below.

Figure 1A:
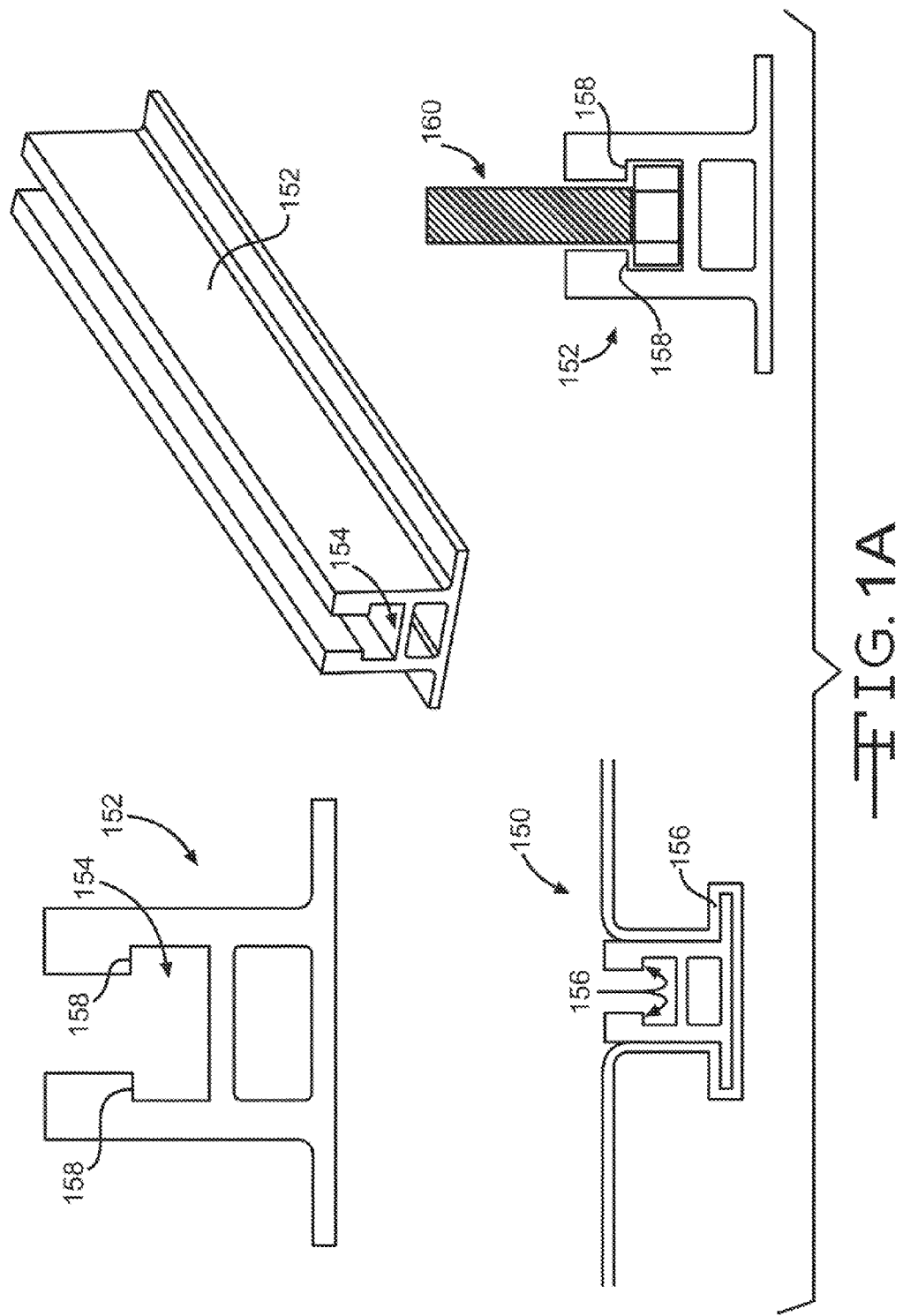

Insert 152, or alternatively edge pair 156, is shaped to receive a fastener 160 (see FIGS. 1A, 6A, and 6B) that secures solar panel 170 to mounting surface 104. Fastener 160 may include a bolt, pin, nail, screw, clip, button, magnetic member, and the like. Insert 152, or alternatively edge pair 156, has an inverted T-shaped cross section that defines a channel 154 within which fastener 160 is inserted. A pair of flanges 158 of insert 152, or alternatively edge pair 156, contact fastener 160 and prevent the fastener 160 from being withdrawn in a direction roughly normal or orthogonal to mounting surface 104. For example, fastener 160 may be a bolt that is slidingly inserted within channel 154 so that the bolt head is positioned under flanges 158, or edge pair 156. Flanges 158 contact the bold head and prevent removal of the bolt in a direction normal to mounting surface 104. Flanges 158 may similarly contact an enlarged feature or component of a pin, nail, screw, clip, button, magnetic member and the like to prevent removal of those fasteners in a direction normal to mounting surface 104. Instead of channel 154, insert 152 may include a plurality of longitudinally arranged apertures (not shown) through which fastener 160 is positioned, threaded, and/or locked. Fastener 160 may be longitudinally positioned with respect to insert 152, and thus mounting surface 104, by positioning, locking, or threading fastener 160 within a respective aperture. One advantage of channel 154 is that the fastener 160 may slide partially or fully along the length of insert 152, which allows fastener 160 to be longitudinally positioned virtually anywhere along insert 152 and thereby allows mounting unit 100 to accommodate and couple with a wider variety of solar panels sizes.

Figure 6A:
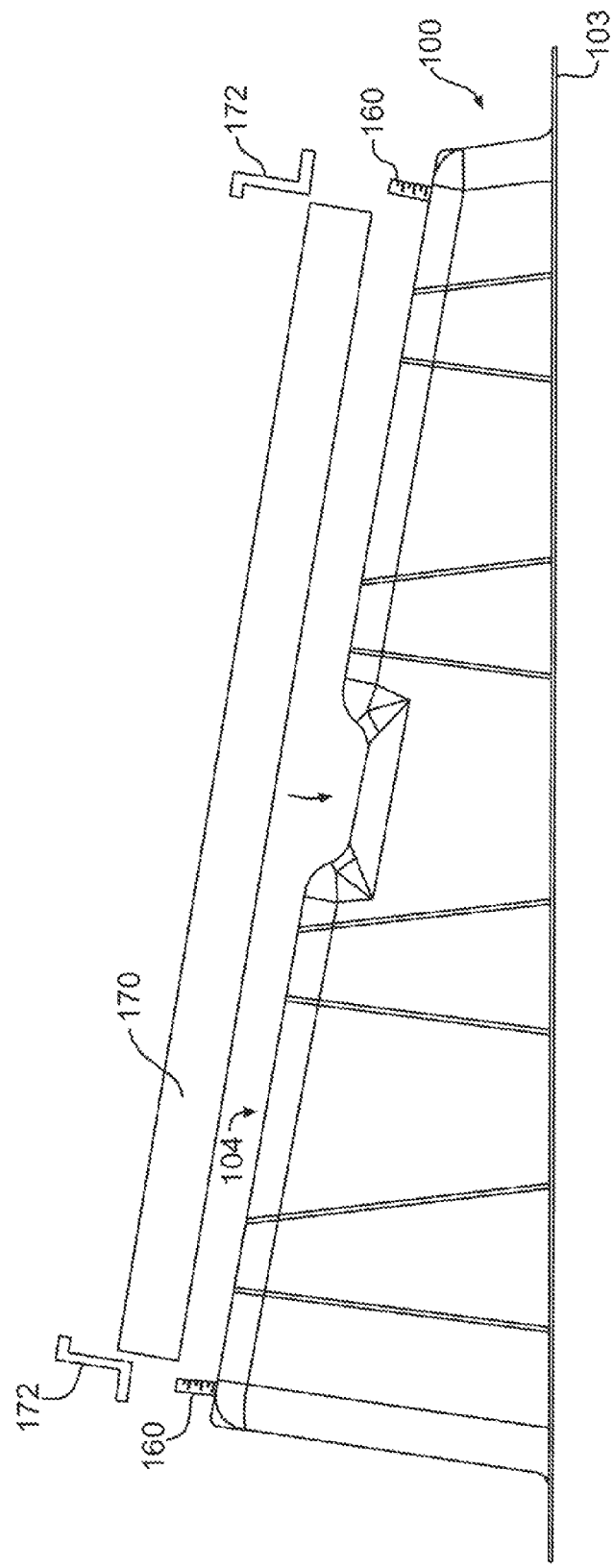

As shown in FIGS. 6A and 6B, fastener 160 may extend roughly normally from mounting surface 104 when positioned within insert 154. Fastener 160 couples with mounting hardware 172 of solar panel 170 to secure solar panel 170 to mounting unit 100. Mounting hardware 172 may include a Z profile mounting plate having an aperture (not shown) through which fastener 160 is inserted. A nut can then be threaded onto the bolt, or fastener 160 may otherwise be secured, to secure mounting hardware 172 (e.g., Z profile plate) to mounting surface 104. FIG. 6C illustrates solar panel 170 having a plurality of solar or photovoltaic cells secured atop mounting surface 104 of mounting unit 100 and mounting unit 100 secured to roof surface 190. As shown, mounting surface 104 may extend beyond solar panel 170 by an amount, B, which may be between about 1 and 10 inches and more commonly about 2 inches (amount B may vary between the longitudinal and transverse directions). This design may limit the amount of wind that can get under solar panel 170 and generate additional wind loads.

As mentioned previously, a flexible membrane or skirt 130 is coupled with mounting unit 100 to secure mounting unit 100 to the surface of roof 190. Flexible membrane or skirt 130 may extend around a portion or the entire periphery of base 102 and may be bonded to an underside of flange 103 or base 102 so that flexible membrane 130 extends laterally beyond flange 103 or base 102 a distance D of between about 1 inch and about 6 inches, and more commonly about 2 inches. In some embodiments, flexible membrane 130 may similarly extend in an opposite direction laterally into an interior of mounting unit 100 up to between about 1 inch and about 6 inches, and more commonly by about 2 to 4 inches. In some embodiments, flexible member 130 may include a solid membrane that spans the interior portion of mounting unit 100, although such embodiments may not allow individual mounting units to be stacked for convenient storage and/or transport as described herein. An interior portion of the solid member may be removed to allow the individual units to be conveniently stacked. Flexible membrane or skirt 130 may further help distribute the loads across the roof's surface to prevent or minimize concentrated or point loads.

Figure 4:
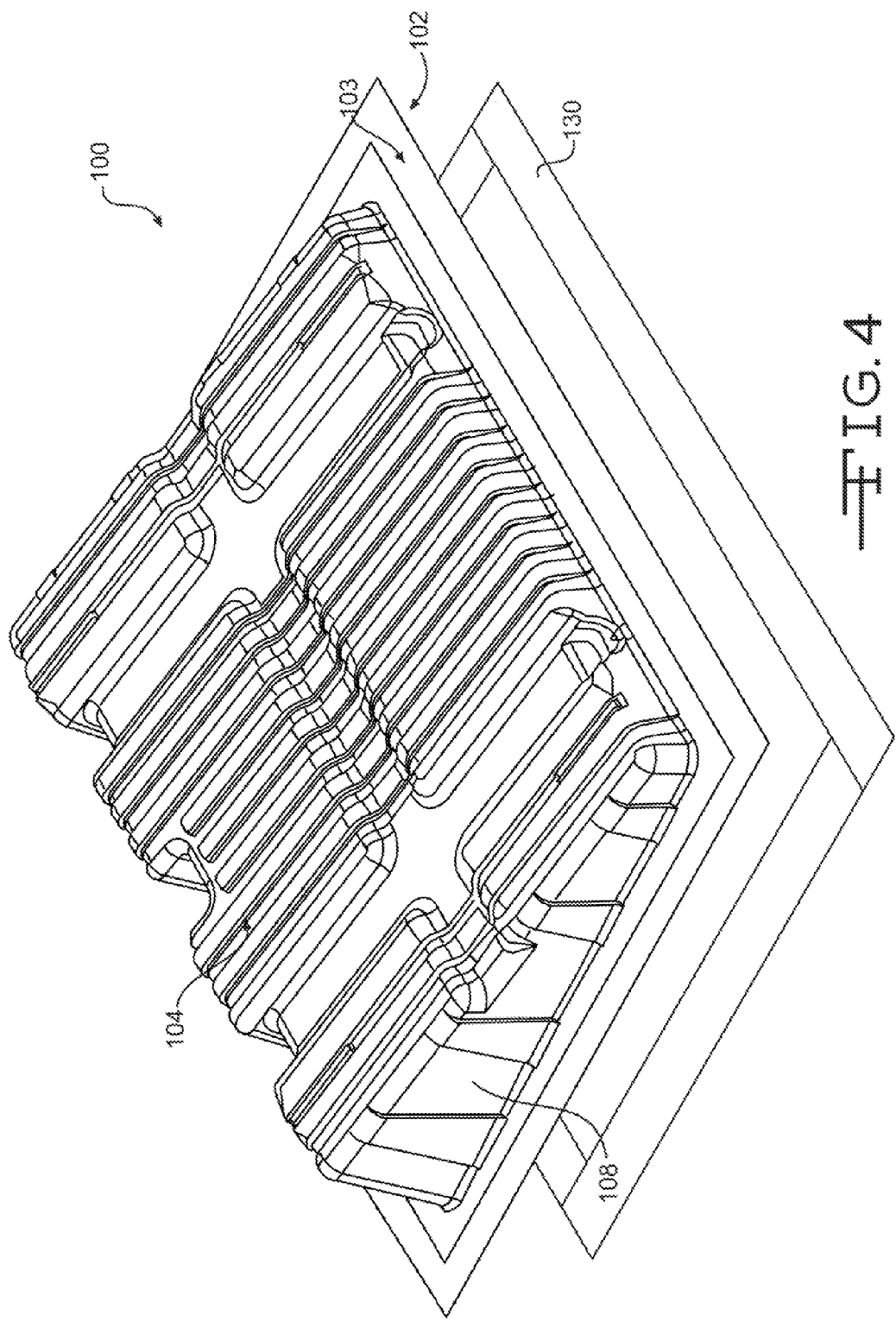
FIG. 4 illustrates a perspective exploded view of a mounting unit and flexible membrane according to an embodiment of the invention.

As shown in FIG. 4, flexible membrane 130 may include multiple segments or strips sized roughly to correspond with a respective side of mounting unit 100 and positioned around the periphery of base 102. In another embodiment, flexible membrane 130 may include a single strip or piece that extends around the periphery, or may include multiple unconnected segments or strips (not shown) that are coupled with one or more sides of mounting unit 100. Flexible membrane 130 may be heat welded, adhesively bonded, mechanically fastened (e.g., via rivets, pins, clamps, and the like), and the like to the underside of flange 103 or base 102. Flexible membrane 130 may be made of roofing membrane materials such as: Thermo Plastic Olefin (TPO), Ethylene Propylene Diene Monomer (EPDM), Polyvinyl Chloride (PVC), thermoplastic vulcanizates (TPV), and the like. In one embodiment, the flexible membrane includes a TPO material with a polyester fleece attached to the bottom surface.

Flexible membrane or skirt 130 may function as a protective layer between flange 103 or base 102 and the roof surface 190 to prevent or limit motion between base 102 or flange 103 and the roof surface 190 that could otherwise result in roof penetrations and eventual leakage. The flexibility of membrane 130 may allow the membrane or skirt to compensate for small variations in the roof's surface 190, thereby functioning to ensure a firm and continuous bond between mounting unit 100 and the roof's surface 190. For example, flexible membrane 130 may flex or bend into or around creases, seams, bends, dips, and the like of roof surface 190 and bond with such uneven surfaces. Likewise, membrane or skirt 130 may conform to and bond with rough or gritty surfaces of the roof, such as asphalt or gravel roofs. The polyester fleece attached to the bottom of the membrane may enable mounting unit 100 to be adhesively bonded to such rough or gritty surfaces by absorbing liquid adhesives that bond with such surfaces. The flexibility of membrane or skirt 130 allows a portion or the entire periphery of mounting unit 100 to be sealed against the roof surface 190.

Figure 5:
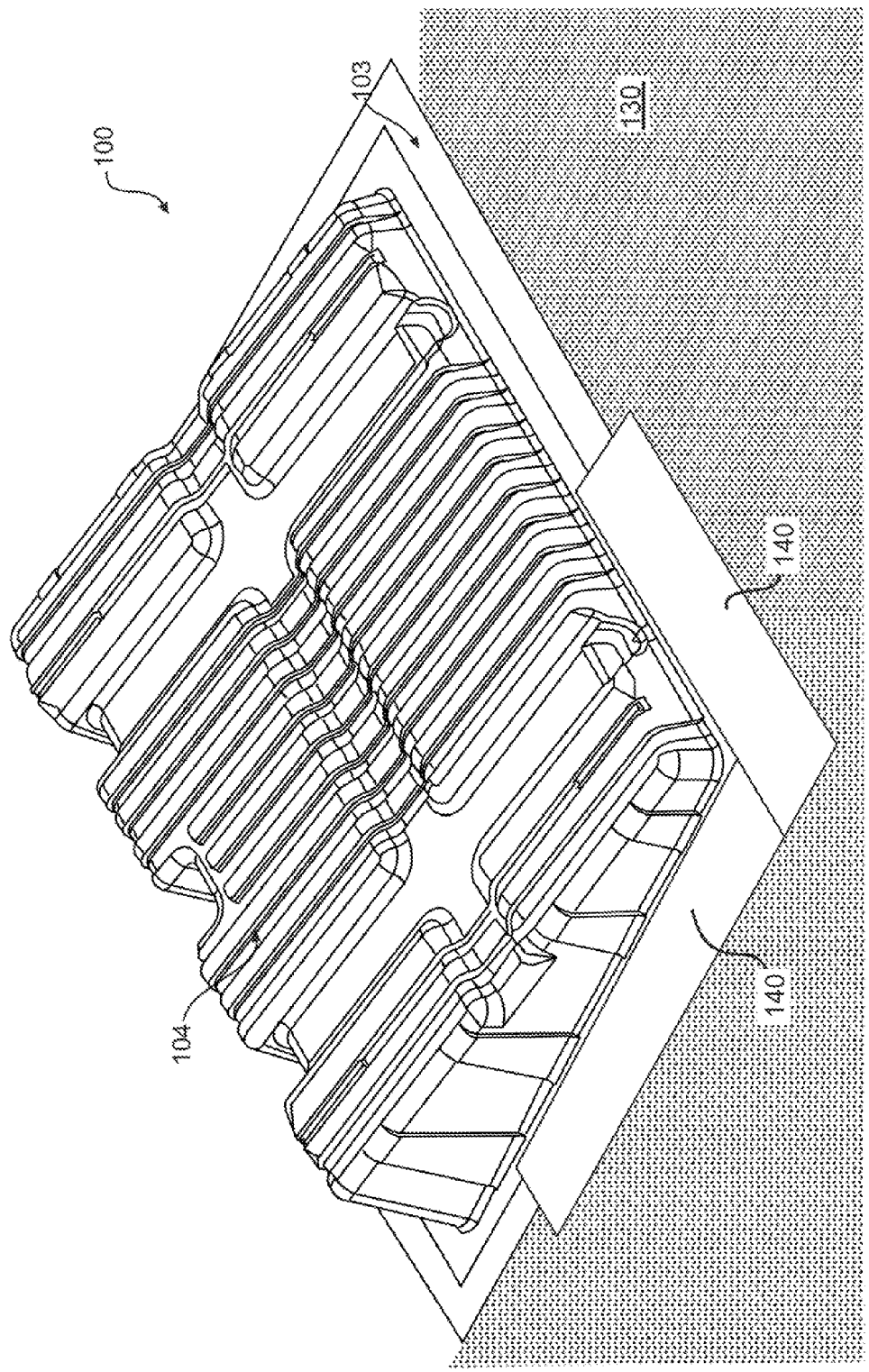
FIG. 5 illustrates a perspective view of the mounting unit of FIG. 4 attached to a roof's surface according to an embodiment of the invention.

To secure mounting unit 100 to the roof, flexible membrane or skirt 130 couples with a membrane material of the roof, which may include Thermo Plastic Olefin (TPO); Ethylene Propylene Diene Monomer (EPDM); Polyvinyl Chloride (PVC); thermoplastic vulcanizates (TPV), Chlorosulfonated Polyethylene (CSPE), Co-polymer Alloy (CPA), Chlorinate Polyethylene (CPE), Ethylene-interpolymer (EIP), Nitrile Butadiene Polymer (NBP), Polyisobutylene (PIB), Keytone Ehtylene Ester (KEE), Modified Bitumen, and the like. Flexible membrane or skirt 130 may be coupled with the roof membrane via an adhesive, tape, heat welding, mechanical fasteners, and the like. For example, as shown in FIG. 5, a tape 140 may be positioned over flexible membrane or skirt 130 and roof surface membrane 190 and pressed onto those surfaces to secure and/or seal mounting unit 100 to the roof and/or to provide weatherproofing to an adhesively mounted mounting unit 100. Tape 140 may be placed around a portion or the entire periphery of the mounting unit 100. Alternatively or additionally, the portion of flexible membrane or skirt 130 laterally extending beyond base 102 or flange 103 may be heat welded to roof surface membrane 190 around a portion or the entire periphery of the mounting unit 100. For example, mounting unit 100 may be positioned against roof surface 190 and a heat welder or other device may be moved around the periphery of mounting unit to apply heat and/or pressure to the laterally extending flexible membrane 130 and the roof membrane so as to heat weld the membranes together. Flexible membrane or skirt 130 may likewise be adhesively bonded or mechanically fastened (e.g., via rivets and the like) to roof surface membrane 190 around a portion or the entire periphery of the mounting unit 100.

The type of fastening employed may depend on the membrane material of the roof 190 and/or skirt 130. For example, heat welding may be use to couple similar membrane materials of the skirt 130 and roof 190 (e.g., to couple a TPO skirt to a TPO roof membrane). Adhesives, mechanical fasteners, and/or tape 140 may be used to couple dissimilar membrane materials of the skirt 130 and roof, such as using polyester fleece and adhesives to couple skirt 130 to gravely or asphalt roofs and using adhesives to couple skirt 130 having membrane polymer A (e.g., TPO) to roof 190 having membrane polymer B (e.g., EPDM). Similarly, the membrane material used for skirt 130 may be selected based on the roof's membrane and the fastening method desired. For example TPO may be selected for the skirt 130 when heat welding is desired and roof 190 includes a TPO membrane. One advantage of coupling membrane or skirt 130 with the roof's membrane 190 using heat welding, adhesives, or tape is that aperture, holes, or other penetrations are not formed/created or minimally formed/created in the roof's membrane. This minimizes or eliminates water, air, and/or other leakage through the roof's membrane and the resulting problems associated therewith. Another advantage of using heat welding, adhesives, or tape to bond membrane or skirt 130 with roof surface 190 is providing a tight seal around a portion or the entire periphery of the mounting unit 100.

Flexible membrane or skirt 130 allows mounting unit 100 to easily couple with various types of roof surfaces. Flexible membrane or skirt 130 further allows mounting unit 100 and attached solar panel 170 to be easily removed from roof's surface 190 and positioned in another area of the roof's surface or on a different roof's surface. For example, flexible membrane 130 may be removed from mounting unit 100 so that mounting unit 100 and attached solar panel 170 may be uncoupled from the roof, moved to a different area or different roof, fitted with another membrane or skirt 130, and reattached to the roof's surface.

Figure 2:
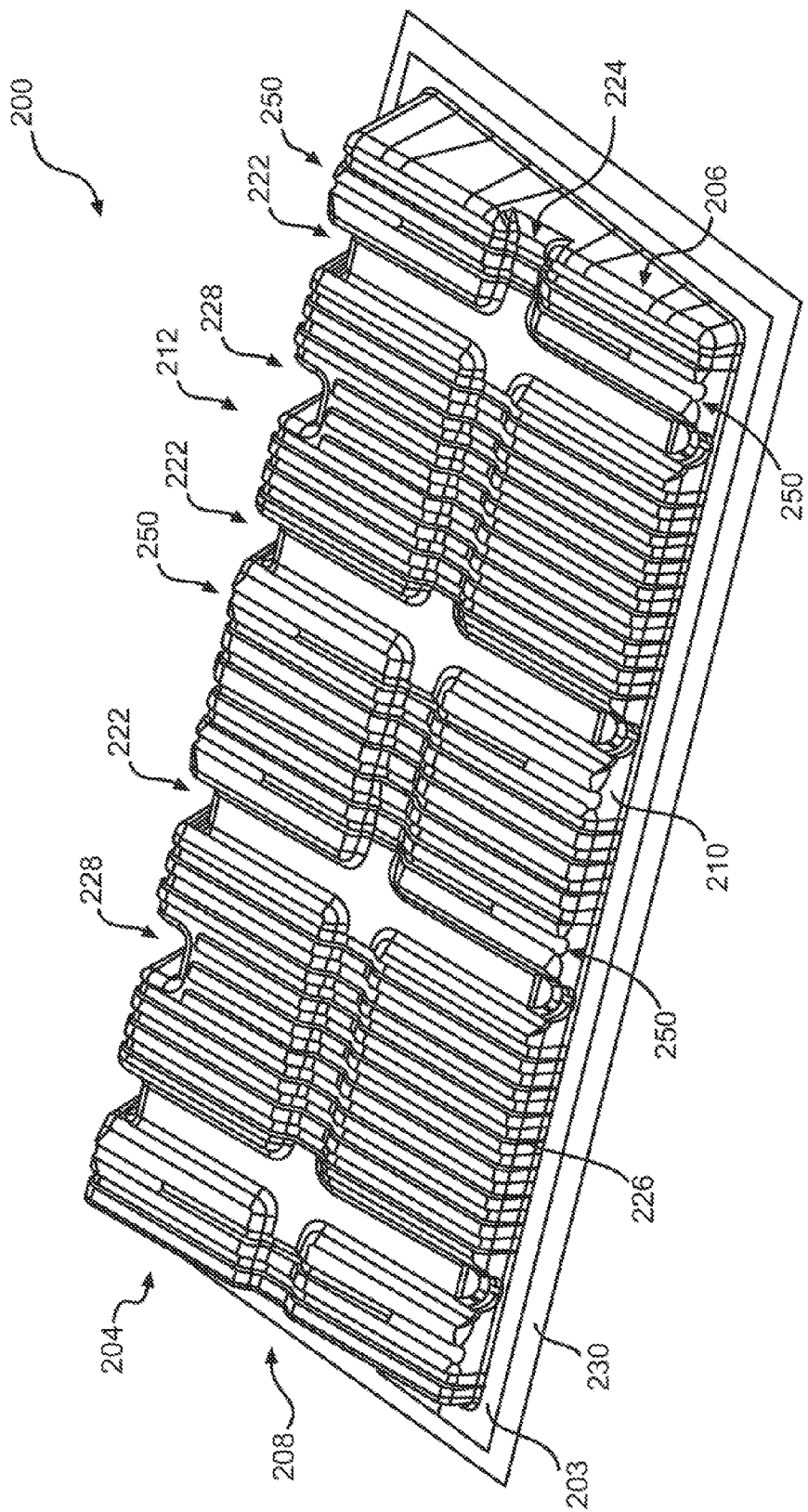
FIG. 2 illustrates a perspective view of an elongated mounting unit according to an embodiment of the invention.

Referring now to FIG. 2, illustrated is another embodiment of a mounting unit 200 having a longitudinally extended front wall 210 and rear wall 222 such that two solar panels (not shown) may be adjacently coupled atop a mounting surface 204 of mounting unit 200. Mounting unit 200 may be approximately twice the longitudinal length of mounting unit 100 to accommodate to solar or photovoltaic panels or modules. Mounting unit 200 may include various feature or components similar to those described above for mounting unit 100 including: mounting features 250, ribs 226 that define narrow channels, main channels 222 and/or 224, side walls 206 and 208, ground channels 228, a flange 203, a membrane or skirt 230, and the like.

Figure 7B:
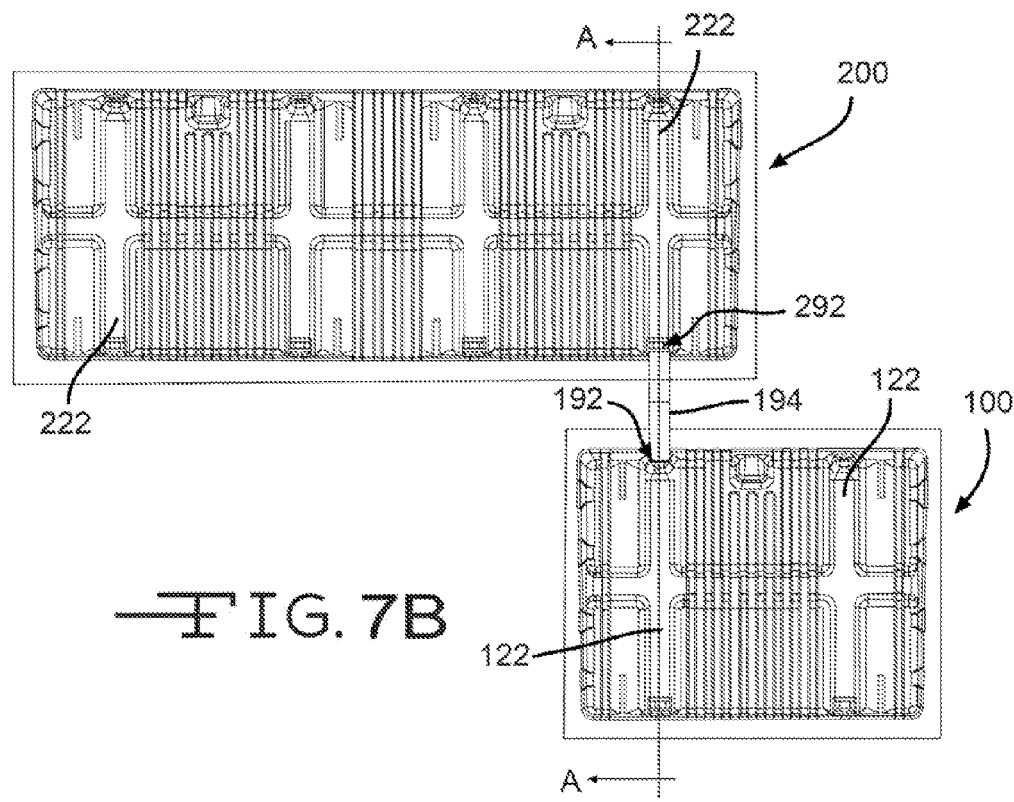
Figure 7C:
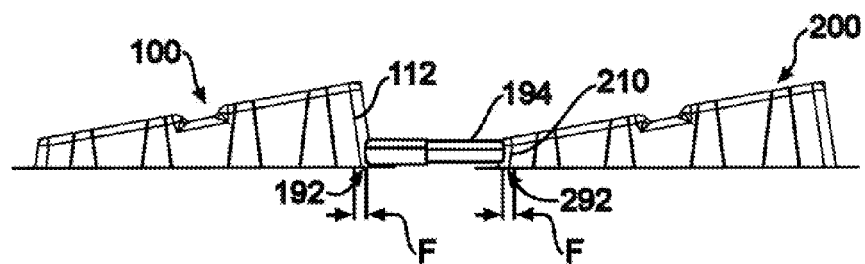

Referring now to FIGS. 7A-7C illustrated is a conduit 194 that may be used to connect the main channels of adjacent mounting units so as to route electrical wires or cables between adjacent mounting units and solar panels. Specifically shown is a mounting unit 200 positioned behind mounting unit 100. Conduit 194 is positioned within a recess 292 on the front wall 210 of mounting unit 200 and within a recess 192 on the back wall 112 of mounting unit 100. As shown in FIGS. 1 and 3C, each main channel 122 (or 222) may include a recess 192 that conduit 194 releasably snaps and locks into. Electrical wires or cables, such as wires 180 may be routed through conduit 192 between adjacent mounting units so as to prevent or limit exposure of the wires to various environmental or other conditions. Conduit 192 may be telescoping so as to be longitudinally adjustable to accommodate various mounting unit arrangements and spacing. To provide the telescoping feature, conduit 192 may include a first tube slidingly disposed within a second tube.

As shown in FIG. 7C, which is a side view of the mounting units of FIG. 7B cut along line A-A, recesses 192 and 292 of mounting units 100 and 200, respectively, may be positioned with respect to rear wall 112 and front wall 210, respectively, such that a spacing F exists between opposite ends of conduit 194 and the respective front and rear walls, 210 and 112. Spacing F may allow one or more wires 180 to be routed along main channel 222, into a distal end of conduit 194, out of a proximal end of conduit 194, and along main channel 122.

Referring now to FIG. 8, illustrated is a method 800 of mounting a solar or photovoltaic panel to a roof of a structure, such as a home or a building. At block 810 a mounting unit is provided or obtained. As described herein, the mounting unit may include a base and/or flange, a mounting surface, and a plurality of walls that connect the mounting surface to the base in an elevated and/or angled fashion. The mounting unit may also be designed to couple with a single solar panel or multiple solar panels as described herein. At block 820, a flexible membrane or skirt may be coupled with the base and/or flange. Coupling the flexible membrane or skirt with the base and/or flange may include heat welding, adhesive bonding, mechanical fastening, and the like. At block 830, the flexible membrane or skirt may be coupled with a surface of the roof to secure the mounting unit to the roof. Coupling the flexible membrane or skirt with the roof surface may include heat welding, adhesive bonding (e.g., adhesive and/or tape), mechanical fastening, and the like. At block 840, a solar panel may be coupled with a mounting surface of the mounting unit. Coupling the solar panel with the mounting surface may include inserting a bolt within a mounting channel of the mounting surface, positioning the bolt through an aperture of a mounting feature of the solar panel, and securing the bolt with respect to the solar panel. The mounting channel may be configured to prevent removal of the bolt in a direction substantially normal to the mounting surface and may comprise an inverted T shape slot as described herein.

The method may also include positioning one or more electrical wires of the solar panel within a main channel of the mounting surface so as to electrically couple the solar panel with one or more other devices. The one or more other devices may include an additional solar panel, a power device, a control device, a DC/DC optimization device, a combiner box, a disconnect switch, a breaker, fuses, a power inverter, and the like.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A mounting unit couplable with a solar panel and a roof of a structure so as to mount the solar panel on the roof, the mounting unit comprising:
   a base;
   a mounting surface connected with the base and configured to couple with the solar panel so that the solar panel is elevated above a surface of the roof;
   a plurality of walls that connect the mounting surface to the base; and
   a flexible membrane coupled with the base and configured to couple with the roof to secure the mounting unit and solar panel to the roof, wherein the mounting unit comprises a hollow interior when coupled with the flexible membrane.

2. The mounting unit of claim 1, wherein the mounting surface is angled with respect to the base, the angle being between about 0 degrees and about 30 degrees.

3. The mounting unit of claim 1, wherein the plurality of walls comprises a rear wall that connects a rear side of the mounting surface to a rear side of the base, wherein the rear wall is oriented at an angle with respect to the base.

4. The mounting unit of claim 3, wherein the angle of the rear wall with respect to the base is between about 95 degrees and about 135 degrees.

5. The mounting, unit of claim 1, wherein the plurality of walls comprises two sides walls that connect opposite sides of the mounting surface with the base, wherein each side wall is oriented at an angle with respect to the base of between about 90 degree and about 135 degrees.

6. The mounting unit of claim 1, wherein the base comprises a flange that extends around a periphery of the mounting unit, and wherein the flexible membrane couples with the flange.

7. The mounting unit of claim 6, further comprising an adhesive tape coupled with a portion of the flexible membrane that extends laterally from the flange and further coupled with the roof.

8. The mounting unit of claim 1, wherein the roof comprises a membrane material being one or more materials selected from the group consisting of: Thermo Plastic Olefin; Ethylene Propylene Diene Monomer; Polyvinyl Chloride; thermoplastic vulcanizates, and bitumen or modified bitumen.

9. The mounting unit of claim 1, wherein the flexible membrane comprises one or more materials selected from the group consisting of: Thermo Plastic Olefin; Ethylene Propylene Diene Monomer; Polyvinyl Chloride; thermoplastic vulcanizates, and Thermo Plastic Olefin backed with a polyester fleece.

10. The mounting unit of claim 1, wherein the mounting unit comprises one or more materials selected from the group consisting of: polyethylene, polyproplylene, styrene, and polyvinyl chloride.

11. The mounting unit of claim 1, wherein the flexible membrane is adhesively bonded with a membrane of the roof.

12. The mounting unit of claim 1, wherein the flexible membrane is heat welded to a membrane of the roof.

13. The mounting unit of claim 1, wherein the flexible membrane is coupled to the roof via one or more mechanical fasteners.

14. The mounting unit of claim 1, wherein the mounting surface comprises a plurality of ribs that define channels that provide air access to a bottom surface of the solar panel.

15. The mounting unit of claim 1, wherein the mounting surface comprises a plurality of T-shaped channels that each slidingly receive a fastener to couple the solar panel with the mounting surface.

16. The mounting unit of claim 15, wherein each T-Shaped channel is configured to allow a respective fastener to be inserted within the T-shaped channel at an endge of the mounting base and slid toward a center portion of the mounting channel.

17. The mounting unit of claim 1, wherein the mounting surface comprises one or more main channels configured to route one or more electrical wires electrically coupled with the solar panel.

18. A mounting unit couplable with a solar panel and a roof of a structure so as to mount the solar panel on the roof, the mounting unit comprising:
 a base comprising a flange that extends around a periphery of the mounting unit, the base being configured to be positioned adjacent the roof of the structure;
 a mounting surface connected with the base and configured to couple with the solar panel so that the solar panel is elevated above the roof's surface and oriented at an angle with respect thereto;
 a plurality of walls that connect the mounting surface to the base; and
 a flexible membrane skirt coupled with the flange and extending laterally therefrom, the flexible membrane skirt being couplable with the roof to secure the mounting unit and solar pond to the roof, wherein the mounting unit comprises a hollow interior when coupled with the flexible membrane skirt.

19. A method of mounting a solar panel to a roof of a structure comprising:
 providing a mounting unit comprising:
  a base;
  a mounting surface; and
  a plurality of walls that connect the mounting surface to the base so that the mounting surface is elevated with respect to the base;
 coupling a flexible membrane with the base such that the mounting unit comprises a hollow interior when coupled with the flexible membrane;
 coupling the flexible membrane with the roof so as to secure the mounting unit to the roof; and
 coupling a solar panel with the mounting surface.

20. The method of claim 19, wherein coupling the flexible membrane with the roof comprises applying an adhesive tape over at least a portion of the flexible membrane and the roof.

21. The method of claim 19, wherein coupling the flexible membrane with the roof comprises adhesively bonding the flexible membrane with a membrane of the roof.

22. The method of claim 19, wherein coupling the flexible membrane with the roof comprises heat welding the flexible membrane to a membrane of the roof.

23. The method of claim 19, wherein coupling the flexible membrane with the roof comprises mechanically fastening the flexible membrane to a membrane of the roof.

24. The method of claim 19, wherein coupling the solar panel with the mounting surface comprises:
 inserting a bolt within a mounting channel of the mounting surface, the mounting channel being configured to prevent removal of the bolt in a direction substantially normal to the mounting surface;
 positioning, the bolt through an aperture of a mounting feature of the solar panel; and
 securing the bolt with respect to the solar panel.

25. The method of claim 19, further comprising positioning one or more electrical wires of the solar panel within a main channel of the mounting surface so as to electrically couple the solar panel with one or more other devices.

26. The method of claim 25, wherein the one or more other devices comprises one or more devices selected from the group consisting of: an additional solar panel, a power device, DC/DC optimization device, a combiner box, a breaker, a fuse, a disconnect switch, a power inverter, and a control device.

* * * * *

UNITED STATES PATENT AND TRADEMARK OFFICE
CERTIFICATE OF CORRECTION

PATENT NO. : 8,418,419 B1
APPLICATION NO. : 13/291802
DATED : April 16, 2013
INVENTOR(S) : Lester Mickel Aseere and Francis John Babineau, Jr.

Page 1 of 1

It is certified that error appears in the above-identified patent and that said Letters Patent is hereby corrected as shown below:

In the Claims

Column 15, line 43 "pond" should read --panel--.

Signed and Sealed this
Eighteenth Day of June, 2013

Teresa Stanek Rea
*Acting Director of the United States Patent and Trademark Office*